US010954072B2

(12) United States Patent
Kühlmann

(10) Patent No.: US 10,954,072 B2
(45) Date of Patent: Mar. 23, 2021

(54) POULTRY BELT DRIVE

(71) Applicant: Franz Josef Kühlmann, Laer (DE)

(72) Inventor: Franz Josef Kühlmann, Laer (DE)

(*) Notice: Subject to any disclaimer, the term of this patent is extended or adjusted under 35 U.S.C. 154(b) by 233 days.

(21) Appl. No.: 16/003,318

(22) Filed: Jun. 8, 2018

(65) Prior Publication Data

US 2018/0319600 A1 Nov. 8, 2018

Related U.S. Application Data

(63) Continuation of application No. PCT/EP2016/072134, filed on Sep. 19, 2016, which is a continuation of application No. PCT/EP2015/079398, filed on Dec. 11, 2015.

(51) Int. Cl.
*B65G 23/08* (2006.01)
*A01K 1/01* (2006.01)
*A01K 31/04* (2006.01)
*B65G 23/12* (2006.01)
*A01K 31/16* (2006.01)

(52) U.S. Cl.
CPC ............ *B65G 23/08* (2013.01); *A01K 1/0135* (2013.01); *A01K 31/04* (2013.01); *A01K 31/165* (2013.01); *B65G 23/12* (2013.01); *B65G 2201/0208* (2013.01); *B65G 2812/02148* (2013.01)

(58) Field of Classification Search
CPC .... A01K 31/22; A01K 1/0117; A01K 31/005; A01K 1/0135; A01K 1/0128; B65G 23/08; B65G 13/06; B65G 23/00; B65G 13/02; B65G 15/00; A22B 7/001

USPC ............... 119/329, 337, 442, 439, 164, 451; 198/835, 789, 788

See application file for complete search history.

(56) References Cited

U.S. PATENT DOCUMENTS

| | | | | |
|---|---|---|---|---|
| 2,302,314 A * | 11/1942 | Haggart | ................. | A01K 39/01 119/456 |
| 2,680,972 A * | 6/1954 | Tone | ....................... | F16H 48/08 475/247 |
| 2,914,864 A * | 12/1959 | Clem | ........................ | D21F 7/02 34/121 |
| 3,055,485 A | 9/1962 | Cordis | | |
| 4,936,257 A * | 6/1990 | Kuhlmann | ............. | A01K 31/04 119/442 |

(Continued)

FOREIGN PATENT DOCUMENTS

| | | |
|---|---|---|
| DE | 4343456 C1 | 5/1994 |
| EP | 1358941 A1 | 11/2003 |
| GB | 1203340 A | 8/1970 |

*Primary Examiner* — Peter M Poon
*Assistant Examiner* — Jeffrey R Larsen
(74) *Attorney, Agent, or Firm* — Jeffrey Joyce, Esq.

(57) ABSTRACT

A belt drive that has a transmission element that transmits a drive force to a drive element, which then sets a belt roller into rotational motion. The transmission element is a shaft and the drive element is an angular gear which has an input that is connected to the transmission element and an output that transmits the rotational motion from the gear to the belt roller. The belt drive is particularly suited for use in a belt system that is used in multi-tier poultry facilities. This belt system according to the invention includes a common drive motor that provides the drive force and a plurality of belt drives, one belt drive for each tier. One or more drive shafts transmit the drive force from the drive motor to each of the belt drives.

5 Claims, 5 Drawing Sheets

(56) References Cited

U.S. PATENT DOCUMENTS 5,011,004 A * 4/1991 D'Amato ............... B65G 13/06
                                              198/789
5,921,452 A    7/1999 Wulf et al.
6,460,690 B1 * 10/2002 Tachibana ............. B65G 13/04
                                              198/791

* cited by examiner

POULTRY BELT DRIVE

BACKGROUND INFORMATION

Field of the Invention

The invention relates to a conveyor belt drive and more particularly, to a belt drive for conveyor belt systems that are used in poultry farming facilities.

Discussion of Prior Art

The use of conventional belt conveyor systems is known in the field of animal husbandry, and particularly in the field of poultry farming, where conveyor belts are commonly used in poultry barns or sheds to transport manure or eggs out of the poultry area. In such conveyor systems, the belt is guided as a continuous, closed loop around rollers, whereby at least one roller is driven, i.e., is a drive roller, and serves to transmit motion to the belt. The rollers may include several elements in addition to a roller. For example, the rollers may have an outer sleeve and/or an inner support component, which, on a drive roller is constructed as driven arbor and on a deflection roller as a non-driven or follower arbor. Bearings may also be provided between these inner and outer elements.

In the conventional poultry belt system, the drive assembly at the belt is a chain and sprocket assembly. A drive motor is provided that pulls the chain, forcing the sprocket to rotate as the chain travels. The sprocket and the drive roller typically rotate about the same axis, and thus, the rotation of the sprocket forces the drive roller to rotate.

The chain and sprocket require a substantial amount of space

What is needed is a poultry belt drive that ensures safe operation of a poultry belt system in a poultry facility. What is further needed is such a poultry belt drive that reduces maintenance requirements to a minimum and is economical to operate. What is yet furthered needed is such a system that provides the necessary flexibility to allows simple adaption measures to construct a poultry belt system that accommodates the parameters of a particular poultry facility.

BRIEF SUMMARY OF THE INVENTION

A poultry belt system with a poultry belt drive according to the invention uses a rotating shaft, referred to hereinafter as a drive shaft, and an angular gear to drive the belt, rather than the chain and sprocket assembly of conventional poultry belt systems. The drive shaft provides the input to the angular gear, such as a worm gear or a bevel gear, which then changes the orientation of the axis of rotation to obtain an output of rotational motion that is in a different plane, for example, is turned 90 degrees. Thus, the drive shaft may be mounted in an orientation that is horizontal and parallel to the longitudinal direction of the belt, and the output from the angular gear to the drive roller may be rotated 90 degrees, so that the axis of rotation of the drive roller is now transverse to the longitudinal direction of the belt. In another example, the drive shaft may be in a vertical orientation, and the output from the angular gear deflected 90 degrees to achieve a horizontal orientation, so that the axis of rotation is changed to the horizontally oriented axis of rotation of the drive roller around which the belt runs.

A wide range of prefabricated angular gear boxes are commercially available. Different types of gears, such as bevel and worm gears are available, as are gears with many different gear ratios. This makes it a relatively simple matter to configure a gear box with the gears and gear ratios that satisfy the demands of the specific installation. If necessary, two different gearings may be provided within the same gearbox: for example, a spur gear for changing speed and torque, and an angular gear, for example, the aforementioned bevel gear or worm gear, placed upstream or downstream of this spur gear, for changing the axis of rotation. Thus, it is possible to obtain the desired gear configuration, economically and on short notice, one that is adapted to the torque to be transmitted, to the drive power that is available, and to the desired transmission ratio. It is also possible to select an angular gear having the structural dimensions that can be accommodated in the available installation space.

Usually, these commercially available angular gears are assembled within a closed housing and, in many cases, the same housings, i.e., housings having identical dimensions are used to house angular gears with different gear ratios, and this outer uniformity simplifies the structural design of a poultry belt system. The fact that these gears are enclosed in a housing has the advantage that it reduces the risk of accident and increases the operational safety of poultry belt drives according to the invention compared to conventional chain and sprocket belt drives. The enclosed configuration of the angular gear, typically with a maintenance-free grease, also reduces the maintenance required for the poultry belt drive, and hence, the operating costs of the poultry belt drive.

The angular gear typically has a comparatively short shaft that extends from the gear box and serves as a connecting element to connect to the drive-side input, which is connected to the drive shaft in a manner known per se, in order to transmit the drive energy to the angular gear. On the output side, the angular gear has a connector, referred to as the output, which may also be configured as a comparatively short shaft, that is connected to the roller, and typically, connected to the rotating axial spindle on the drive roller.

The compact design of the poultry belt drive according to the invention is also an advantage. The amount of space required for the angular gear to operate the drive roller at the design speed is much less than that required to accommodate sprockets. This makes it possible to construct a poultry belt drive according to the invention that is suitable for many structurally differently configured poultry barns or sheds. In particular, the structural designs of different poultry belt drives, in which the drive rollers of the belts are to rotate at different speeds, requires only the use of a suitable angular gear with the appropriate gear ratio, instead of having to adapt the barn to accommodate the different diameters of the necessary sprockets.

Manure belts place additional demands on a poultry belt system, because they need to be cleaned. One way of doing this in conventional chain and sprocket systems is to make the belts slippery, so that the manure does not adhere to it very well. Also, a press roller is often provided adjacent the drive roller. In this case, the manure belt runs around outer side of the drive roller and then between the drive roller and the press roller. The press roller may be mounted such that, according to its name, it actually presses the manure belt against the drive roller. It is often, however mounted as a deflection roller, although it is still referred to by its traditional name, i.e., press roller. In this case, the press roller is mounted such, that the distance between the drive roller and press roller is greater than the thickness of the manure belt, so that the press roller does not push the manure belt in the literal sense against the drive roller, but by means of the turn in direction of the belt, ensures the greatest angle of wrap of the belt around the drive roller as possible as the belt travels around drive roller.

In conventional systems, the press roller is always a driven roller, so as to transfer the drive power as effectively as possible from the chain to the manure belt. The sprockets of the drive roller and the press roller therefore both engage with the chain. Depending on the distance of the drive and press rollers and depending on the diameter of the desired sprockets and their diameters, it is possible that the sprockets collide with each other, and, to avoid this, the design for the poultry belt drive has to be revised and recalculated.

By contrast, with the poultry belt drive according to the invention, the design of a system configuration in which a drive roller and a press roller are mounted closely adjacent is particularly simple and advantageous. The two angular gears are mounted close to each other such, that the two adjacent rollers, the drive roller and the press roller, are set into rotation. The two angular gears are structurally designed to provide different directions of rotation, so that drive and press rollers rotate in a conventional manner with different directions of rotation. Using two angular gears eliminates the need for an additional gear means for reversing the direction of rotation between one angular gear and one of the two rollers. Also, to avoid having to guide two separate shafts from the drive motor to the two angular gears, one of the two angular gears has a second output, referred to as a forwarder, that is connected to the input of the second angular gear by means of an intermediate shaft, which transmits the input from the drive shaft also to the second angular gear. The two angular gears may also have different transmission ratios to accommodate the different diameters of the drive and press rollers.

The mentioned forwarder may advantageously be designed in the manner of an extension of the input, so that the input and the forwarder of the same angular gear run at the same speed. This allows for a particularly simple construction of this angular gear, making it particularly cost-effective.

Advantageously, the intermediate shaft that is connected to the one and/or to the other bevel gear is in the form of a sliding or length-adjustable piece, so that the distance between the two angular gears may be adjusted. The change in distance between the drive roller and press roller may optionally take the form of a parallel displacement, but it may also allow one of the two rollers to be deliberately aligned at an angle, i.e., obliquely, to the other roller. This may be desirable as a way to influence the belt run, for example, to prevent a lateral migration of the belt away from its specified track.

The intermediate shaft may be made from a rod or tube material, which is available as a semi-finished product and is cut to the desired length to adapt the shaft to the desired distance between the two angular gears in a particular poultry belt system. This increases the cost-effectiveness of the poultry belt system and especially the poultry belt drives according to the invention, the basic design of which is already very economical.

Constructing the intermediate shaft as a sliding piece has the advantage that fine adjustment of the distance between the two adjacent angular gears does not require the use of exactly matched intermediate shafts. Rather, fine adjustments may be made by connecting the intermediate shaft to the forwarder of the one angular gear or to the input of the other angular gear in such a way, that the two components in question may be moved relative to each other in the axial direction.

One way to enable the aforementioned fine adjustment is to mount at least one of the two angular gears in elongated holes on a bracket. The bracket may be part of the machine frame of the poultry belt system or a bracket that is mounted on one angular gear and in turn supports the other angular gear. The elongated holes may be provided in the housing of the respective angular gear or in the bracket itself, so that, in any case, the angular gear may be fastened at different positions on the bracket and, in this way, enable setting different distances between the two angular gears.

It is also possible to incline the respective roller, for example, the drive roller or the press roller, relative to the angular gear that drives this roller. For this purpose, a separate angle compensating coupling may be provided as an additional component between the angular gear and the roller associated therewith. Alternatively, however, the output of the angular gear itself can be configured as an angle compensating coupling. For example, the end of the output may be shaped like a mushroom head. By mushroom shape is meant in this context that, first, the output, seen in the longitudinal cross-section, has a rounded contour extending toward its end, so that the associated roller may be connected at an angle, i.e., obliquely, to the output of the angular gear, and, second, that the output has a narrowed circumferential contour some a distance from its end in which the shaft of the roller can dip slightly in the event of a skew. In any case, it is possible to adjust the associated roller by means of the angle compensating coupling without the angular gear that drives the roller also having to be newly aligned and mounted at an angle.

The structurally simple and space-saving design of the poultry belt drive according to the invention makes it possible to construct a particularly economical poultry belt system, in which two belts are arranged, one above the other on two or more tiers, as is known, for example, in poultry facilities in which the birds are held on several tiers, one above the other. A common drive motor may be provided to operate a poultry belt system for multiple tiers, the motor driving a common shaft that transmits rotational motion to all the belt drives in the system. Transfer gears may be used for branching off of the common shaft. Thus, for example, this common shaft is part of a first poultry belt drive, a vertically connecting shaft extends from this common shaft into the next tier, a second poultry belt drive is driven at this second tier by the same drive motor. This set-up with a common motor to operate belt drives on a plurality of tiers is particularly cost-effective, because it eliminates the additional costs that are otherwise incurred when separate drive motors are used at each tier.

A particularly economical embodiment of the poultry belt system is made possible by not using one angular gear to transmit the rotational motion of the shaft the drive roller and and another one to transmit the motion to the press roller, but instead, to drive only one of these rollers with a single angular gear and to use a gear pair to drive the other roller. Using a spur gear for this purpose is particularly cost-effective.

The gear teeth of the two gears in the gear pair may have a clearance between them of 2 to 8 mm, and preferably, 3 to 5 mm. This allows the axial distance between the drive roller and the press roller to be adjusted and ensures trouble-free and reliable operation of the gear pair and also allows a sufficiently large range of adjustment for axial spacing.

The poultry belt drive according to the invention provides many advantages. First, replacing the chain and sprocket drive means with a shaft and gears eliminates the safety risks inherent to the use of an open running chain and sprocket.

The shaft used in the poultry belt drive according to the invention has a closed or smooth surface, which reduces the likelihood of injury to personnel and interruptions in operation of the belt. It is also possible to enclose the rotating shaft in a non-rotating sleeve to increase safety, and this safety measure is much less costly and requires substantially less space than, for example, enclosing a chain. A further advantage is that, due to the small footprint of the poultry belt system, the parts of the belt drive are easily accessible. Additional components such as chain tensioners or similar elements that are needed in chain and sprocket drives are not required and this further reduces the cost of operating the poultry belt system according to the invention, because maintenance for such parts is eliminated. Furthermore, the use and commercial availability of angular gears that are suitable for use in the poultry belt drive according to the invention simplify the design and construction of poultry belt systems that are individually adapted to the parameters of different poultry facilities.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
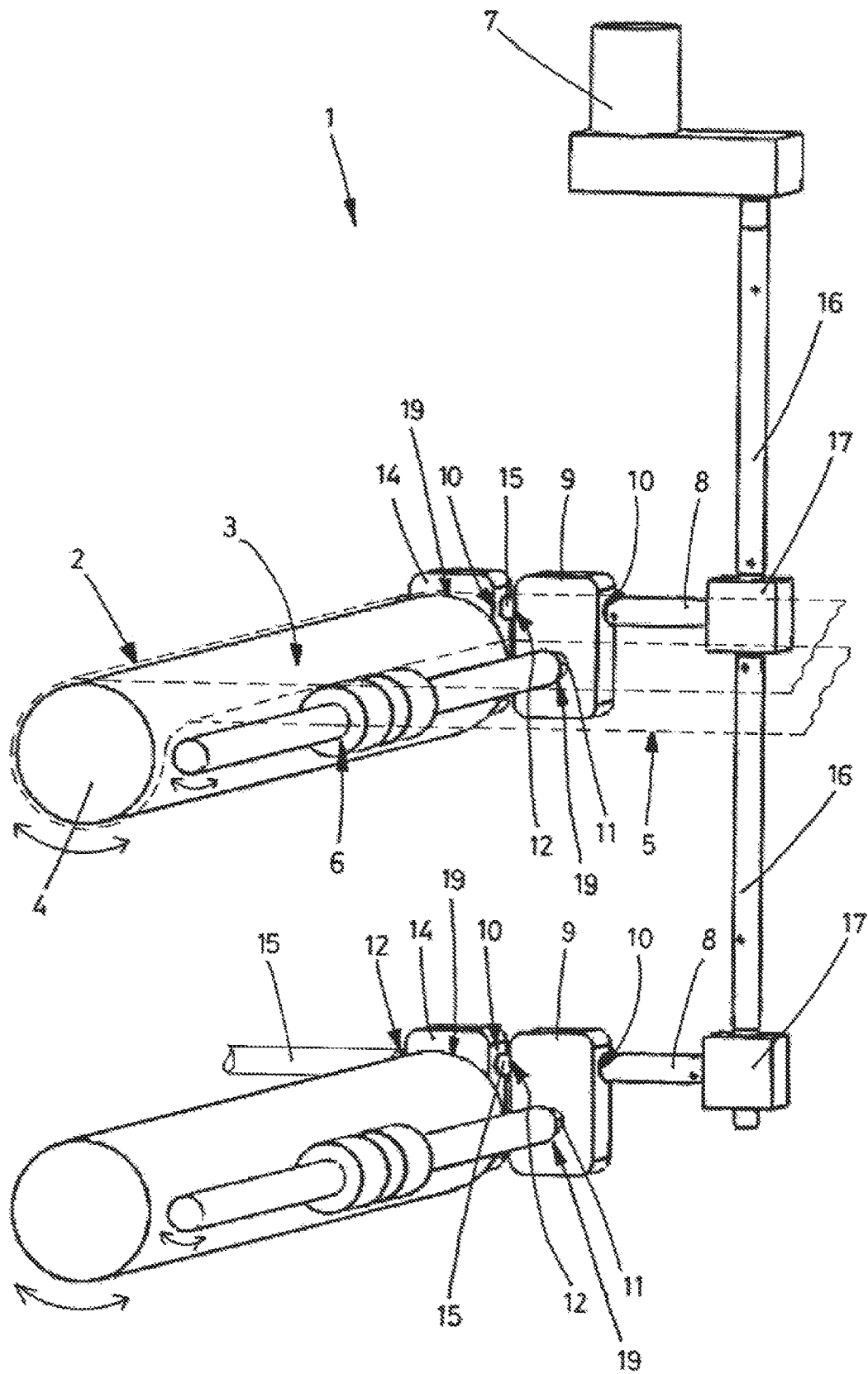
FIG. 1 is a front perspective view of a first embodiment of a poultry belt system according to the invention, showing a common drive motor that operate the belt drives for two separate tiers in a poultry farming facility.
Figure 2:
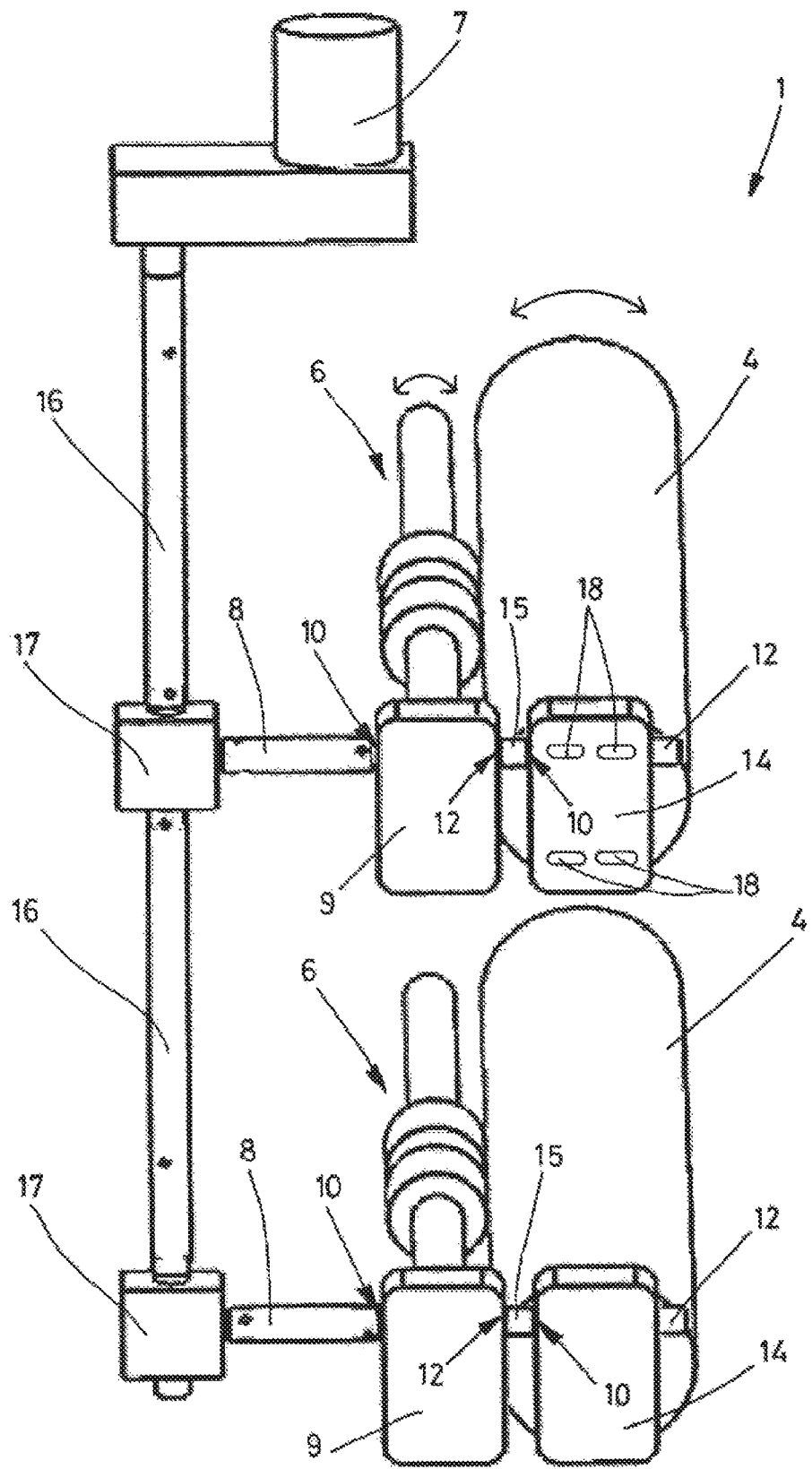
FIG. 2 is a rear perspective view of the poultry belt system shown in FIG. 1.

FIGS. 1 and 2 illustrate schematically and only partially a first embodiment of a poultry belt system having a poultry belt drive 1 according to the invention that comprises a belt 2, shown in dashed lines, a roller assembly that includes a drive roller 4 and a press roller 6, and a roller drive unit that includes at least one drive shaft 8, and at least one angular gear 9 or 14 to drive the rollers. An upper belt run 3 of the belt is guided around the drive roller and its lower belt run 5 around the press roller 6, so that the belt 2 has a particularly large wrap angle of greater than 180 degrees around the drive roller 4. The press roller 6, in contrast to the drive roller 4, does not have the same diameter across its entire width, but rather, has a plurality of individual roller bodies 6A mounted on it. These roller bodies 6A are spaced apart and are also not distributed across the entire width of the shaft. By way of example only two such roller bodies 6A are shown and it is understood that, depending on the particular installation of the poultry belt system, more than two roller bodies 6A may be provided.

The drive roller 4 and the press roller 6 are mounted separately, for example, on separate end plates, so that the inclination of the rollers 4 and 6 relative to the belt 2 may be adjusted independently, or a parallel displacement between the rollers in the longitudinal direction of the belt 2 may be adjusted. Thus, the angular orientation of the rollers 4, 6 relative to the belt 2, as well as the distance between these two rollers, may be adjusted.

A drive motor 7 drives the drive shaft 8 that extends to the angular gear 9, which in turn drives the press roller 6. It is assumed that the angular gears used in all embodiments disclosed herein are worm gears. It is understood, however, that other types of angular gears may be used, for example, bevel gears. The angular gear 9 has an input 10 that receives the rotational motion from the drive shaft 8 and an output 11 that sets the press roller 6 in rotational motion. This first angular gear 9 has a second output 12, referred to as a forwarder, which drives a second angular gear 14. An intermediate shaft 15 connects the forwarder 12 of the first bevel gear 9 with an input 10 of the second angular gear 14, and an output 11 of the second angular gear 14 sets the drive roller 4 in rotational motion. The intermediate shaft 15 is preferably adjustable in length along its axial direction and connected to the forwarder 12 and/or the input 10 of the second angular gear 14.

FIGS. 1-5 illustrate two embodiments of the poultry belt system according to the invention, each embodiment having two tiers. It is understood, of course, that the systems may encompass just a single tier or more than two tiers. In the first embodiment shown in FIGS. 1 and 2, a main power shaft 16 is connected to the common drive motor 7 and extends vertically down to the individual tiers and connects to the poultry belt drive 1 that is provided at each tier. A branch or transfer case 17 is driven by the rotational motion of this main power shaft 16 and transmits this motion to the horizontally extending drive shaft 8 in the upper tier.

The drive roller 4 and press roller 6, and the angular gears 9 and 14 are provided at each end of the belt at each tier, whereby only one end of the belts 2 is shown in the figures. As shown in FIG. 1, an additional, long intermediate shaft 15A at the lower of the two tiers extends from the second angular gear 14 to the second end of the belt 2 and serves as the input to drive the drive roller 4 and the press roller 6 at that second end. For this reason, each second angular gear 14 shown in these figures has a forwarder 12 that sets the long intermediate shafts 15A in rotation.

A further section of the main power shaft 16 extends down to the lower transfer case 17 at the next lower tier. The poultry belt drive 1 at this lower tier is identical to the drive 1 at the upper tier. In an embodiment of a poultry belt system having three or more tiers, the main power shaft 16 extends accordingly to all tiers, connecting to additional transfer cases 17 and additional poultry belt drives 1 that are provided at each tier.

The first and second angular gears 9 and 14 each have housings or gearboxes that appear externally to be identical although different gears may be enclosed within. For example, different gear ratios may be used to drive the belts 2 at the different tiers at different speeds. It is also possible that the belts 2 at the various tiers are to run at the same speed, but gears in the transfer cases 17 are selected to allow the drive shafts 8 at the different tiers to be driven at different speeds.

Elongated holes 18 are shown, merely as an example, in the housing of the second angular gear 14 in the upper tier of FIG. 2. These elongated holes 18 extend horizontally and allow the distance between this second angular gear 14 and the first angular gear 9 to be adjusted to a limited degree.

Double-headed arrows at the ends of the drive rollers 4 and press rollers 6 indicate that the two rollers may be connected to the angular gears 9 and 14 in a manner that allows small angular displacements. This is possible, because the outputs 11 of the angular gears 9 and 14 include an angle compensating coupling 19. The angle compensating coupling 19 may be configured as a separate coupling element which is mounted between the output 11 and the respective roller, but may, however, also be an integral feature of the respective output 11.

Figure 3:
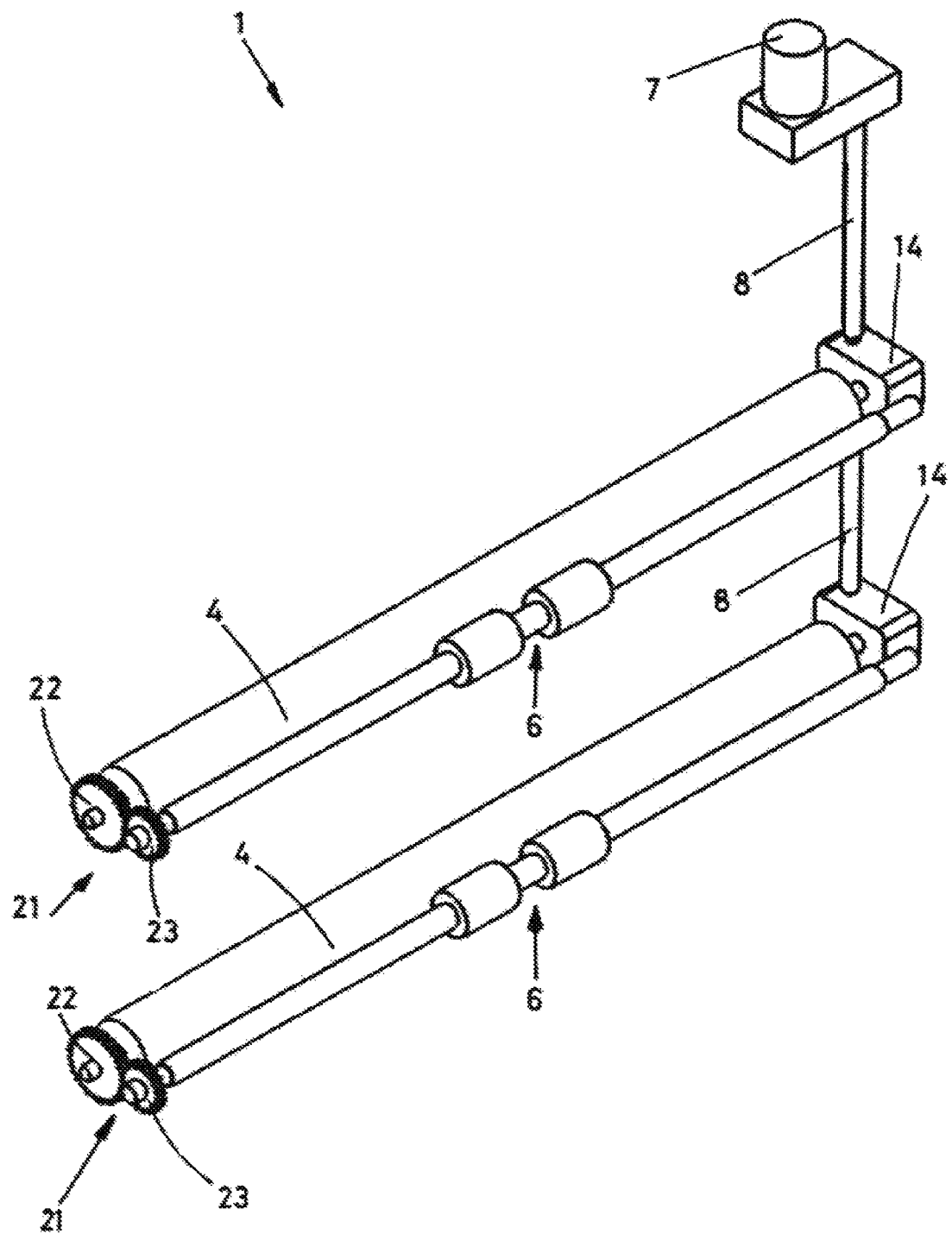
FIG. 3 is a perspective view of a second embodiment of a poultry belt system according to the invention, illustrating the use of a gear pair to drive the drive roller and press roller.
Figure 4:
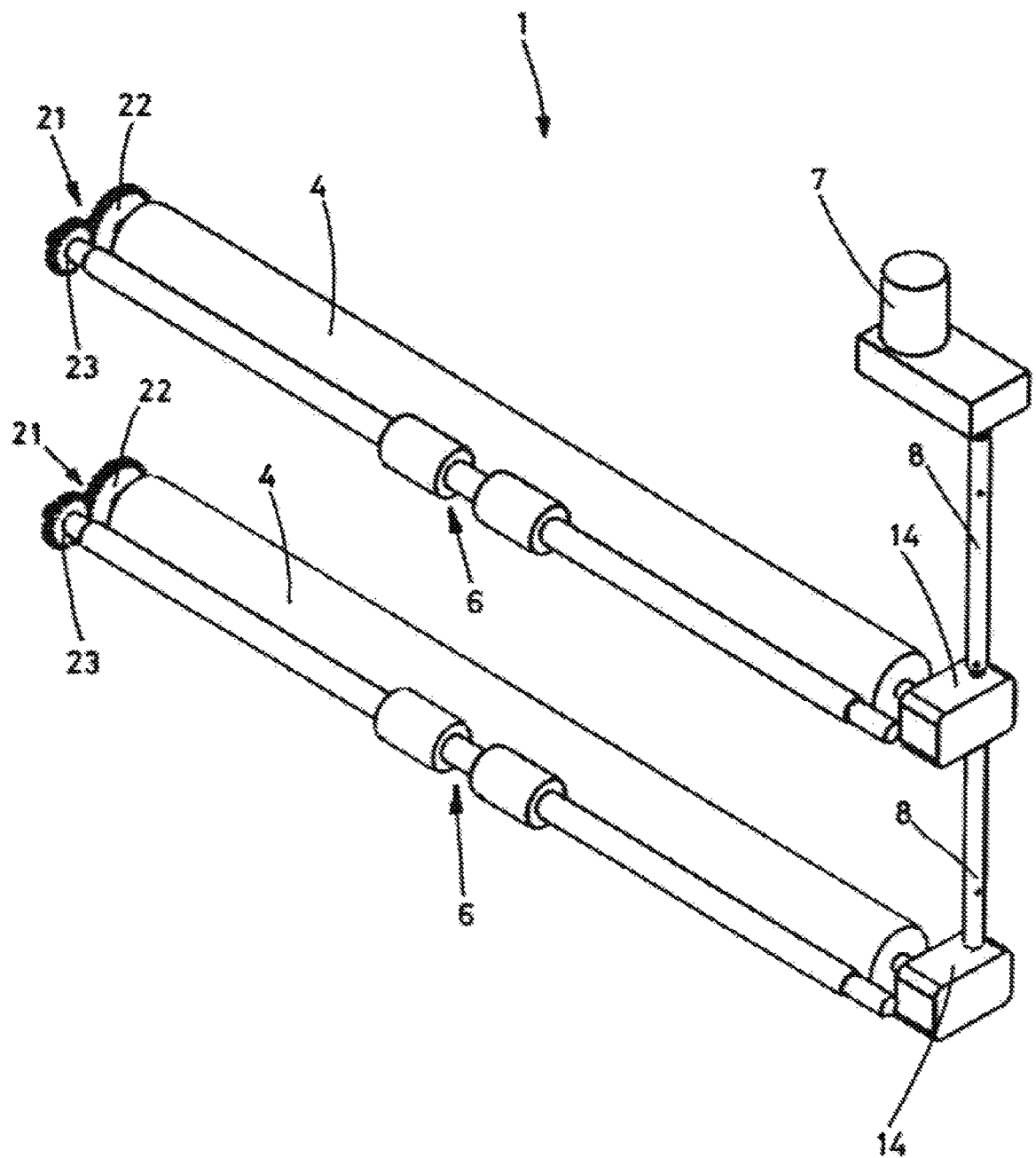
FIG. 4 is another perspective view of the poultry belt system shown in FIG. 3.
Figure 5:
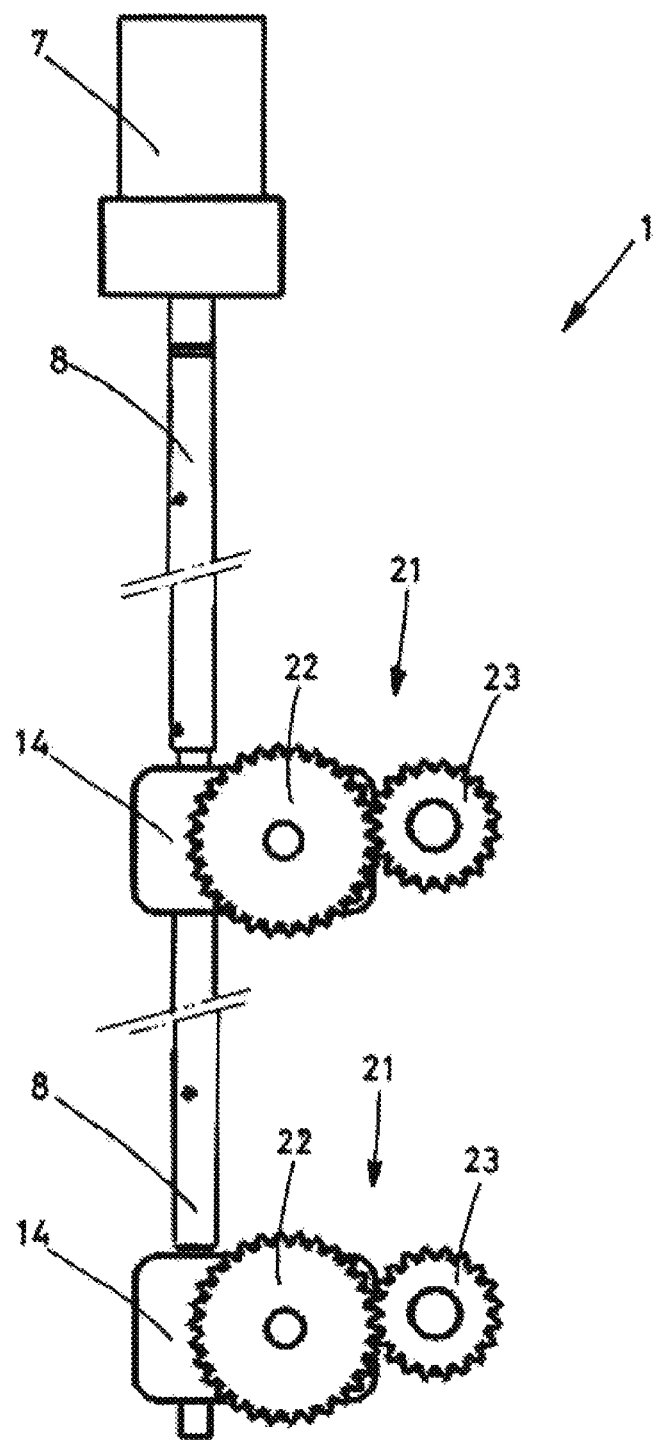
FIG. 5 is a rear plane view of the second embodiment of the poultry belt system.

FIGS. 3 to 5 illustrate a second embodiment of a poultry belt system. The actual belt 2 is not shown in these drawings. Also, a two-tier poultry belt system is shown in this second embodiment, but again, it is understood that the poultry belt system according to the invention may encompass a single tier or more than two tiers. The drive shaft 8 in this second embodiment extends to both tiers, and, in this respect, is similar to the main power shaft 16 shown in FIGS. 1 and 2. But because it directly drives the angular gear 14, which sets the drive rollers 4 in rotation, this shaft is also comparable to the drive shaft 8 in FIGS. 1 and 2 and, for this reason, is also identified with the number 8 in this second embodiment.

In this second embodiment, only one of the angular gears 9 or 14 is used to drive the respective roller 6 or 4, and a gear pair 21 is used to transmit the rotational motion from the one roller to the other other. The drawings show that the drive shaft 8 runs from the drive motor 7 to the two angular gears 14, which drive the drive rollers 4 in the two tiers, and that the gear pair 21 transmits the motion from the drive roller 4 to the press roller 6. But it is also possible to have the drive shaft 8 drive the press roller 6 via the angular gear 9 discussed with reference to the first embodiment, and to use the gear pair 21 to set the drive roller 4 in motion.

The gear pair 21 includes a relatively large first gear 22 that rotates together with the drive roller 4, and a relatively small second gear 23 that rotates together with the press roller 6. The sizes of the gears 22 and 23 and, thus, the gear ratio of the gear pair 21 that are shown are purely illustrative and shown only as an example. The gear pair 21 is mounted at the ends of the drive roller 4 and the press roller 6 that are opposite the angular gear 14. It is, however, also possible to mount the gear pair 21 at the ends of the drive roller 4 and the press roller 6 that are close to the angular gear 14. Regardless of which end the gear pair 21 is mounted, the drive components are readily accessible in a manner that simplifies assembly and subsequent maintenance.

A certain degree of play or clearance, for example, about 2 to 8 mm and preferably about 3 to 5 mm, is allowed between the two gears 22 and 23 without negatively influencing the function of the gear pair 21. This clearance allows the axial distance between the drive roller 4 and the press roller 6 to be adjusted within certain limits. It is also possible to adjust the angle between the drive roller 4 and the press roller 6, by moving the free end of the press roller 6, which is adjacent the angular gear 14, closer to or farther away from the drive roller 4, in order to influence the travel of the belt 2.

In the illustrated embodiment, the gears 22 and 23 of the gear pair 21 are exposed. It is, of course, possible to enclose the gear pair 21 in a housing, to prevent contamination or operational disturbances of the gear pair 21, as well as to avoid the safety risks posed by exposed gears.

It is understood that the embodiments described herein are merely illustrative of the present invention. Variations in the construction of the poultry belt system and poultry belt drive according to the invention may be contemplated by one skilled in the art without limiting the intended scope of the invention herein disclosed and as defined by the following claims.

What is claimed is:

1. A poultry belt system for use in a poultry facility having a plurality of tiers for holding poultry, each tier in the plurality of tiers arranged one tier above another tier, the poultry belt system comprising:

a drive motor and a main power shaft that extends from the drive motor to each tier of the plurality of tiers, the drive motor driving the main power shaft such that the main power shaft transmits a rotational drive motion;

a plurality of belts corresponding in number to the number of tiers in the plurality of tiers, one belt from the plurality of belts placed in each one of the plurality of tiers;

a plurality of roller assemblies, at least one roller assembly from the plurality of roller assemblies mounted in each tier of the plurality of tiers such that the belt in each tier of the plurality of tiers travels around the roller assembly of the at least one roller assembly in each of the plurality of tiers, each roller assembly including a drive roller and a press roller that are mounted adjacent to each other, each drive roller having a first gear and each press roller having a second gear with each first gear and each second gear mounted such that they form a gear pair;

a plurality of angular gears, each angular gear in the plurality of angular gears having an input that connects to the main power shaft and an output that connects one-to-one to one corresponding roller assembly from the plurality of roller assemblies;

wherein each angular gear from the plurality of angular gears receives the rotational drive motion from the main power shaft and outputs the rotational drive motion to the one corresponding roller assembly from the plurality of roller assemblies, thereby setting either the corresponding drive roller or the corresponding press roller in motion; and wherein the drive roller or press roller that is set in motion by the angular gear transmits the rotational motion to the gear pair, the drive roller or press roller that is set in motion setting in motion the drive roller or press roller that is not set in motion by the angular gear.

2. The belt drive of claim 1, wherein the first gear and second have a play of 2 mm to 8 mm.

3. The belt drive of claim 1, wherein the first gear and second gear have a play of 3 mm to 5 mm.

4. The belt drive of claim 1, wherein the output of the angular gear is connected to the roller assembly by means of an angle compensating coupling.

5. The belt drive of claim 1, wherein the angular gear is a worm gear.

* * * * *